W. S. ADAMS.
PASSENGER CAR.
APPLICATION FILED FEB. 15, 1912.

1,068,201.

Patented July 22, 1913.

3 SHEETS—SHEET 3.

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

PASSENGER-CAR.

1,068,201.    Specification of Letters Patent.    Patented July 22, 1913.

Application filed February 15, 1912. Serial No. 677,729.

*To all whom it may concern:*

Be it known that I, WALTER S. ADAMS, a citizen of the United States, residing in Philadelphia, Pennsylvania, have invented certain Improvements in Passenger-Cars, of which the following is a specification.

The object of this invention is to reduce the height of the steps leading from the ground to the platform of a passenger car of the city or suburban type and at the same time utilize trucks having wheels of comparatively great diameter. Heretofore, in cars constructed in this manner, a single step has been objectionable, owing to the fact that the distance between the ground and the step and the step and the platform is too great for a passenger to conveniently board or leave the car.

By my invention I retain the height of the body of the car and yet make a comparatively low step leading to the platform of the car.

Figure 1:
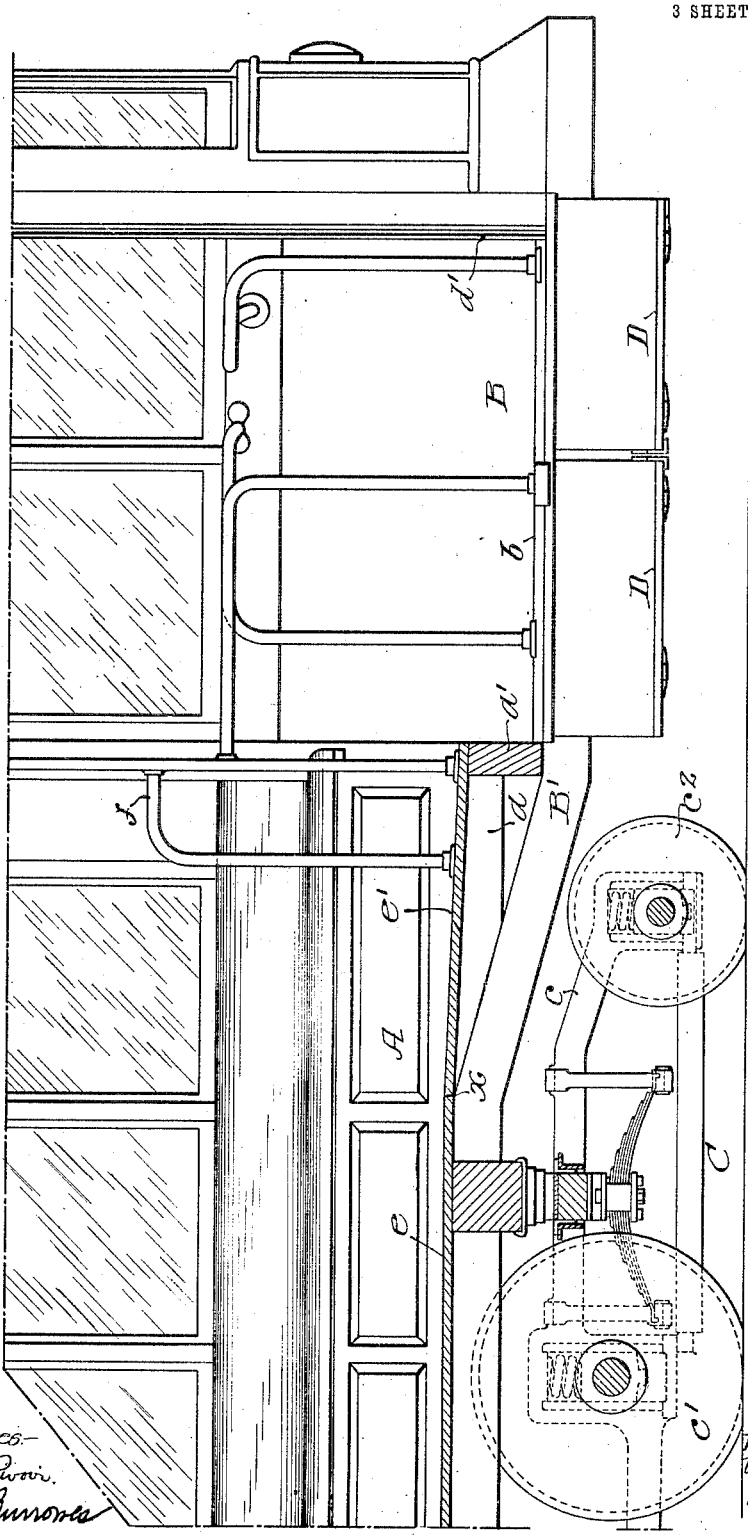
Figure 2:
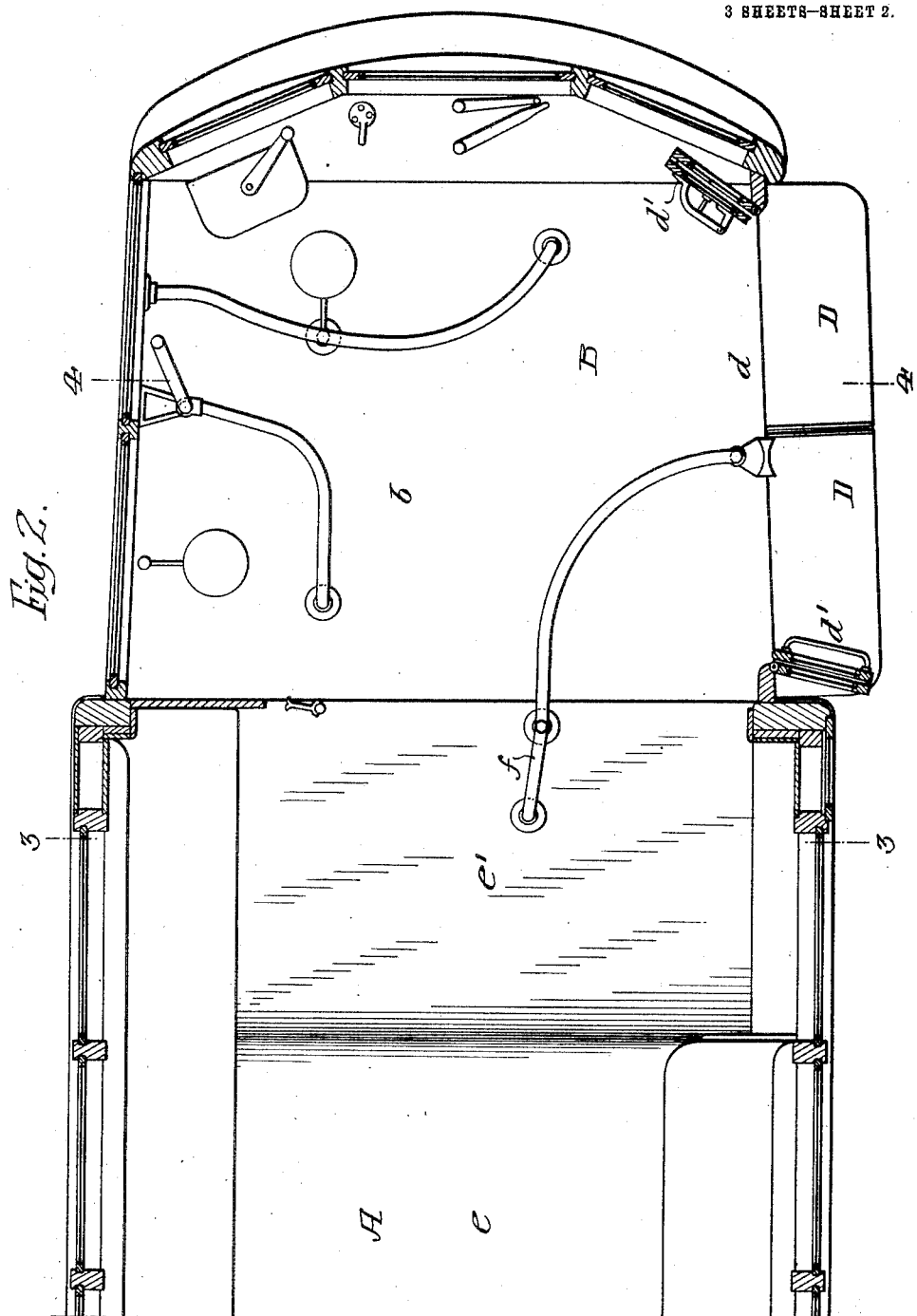
Figure 3:
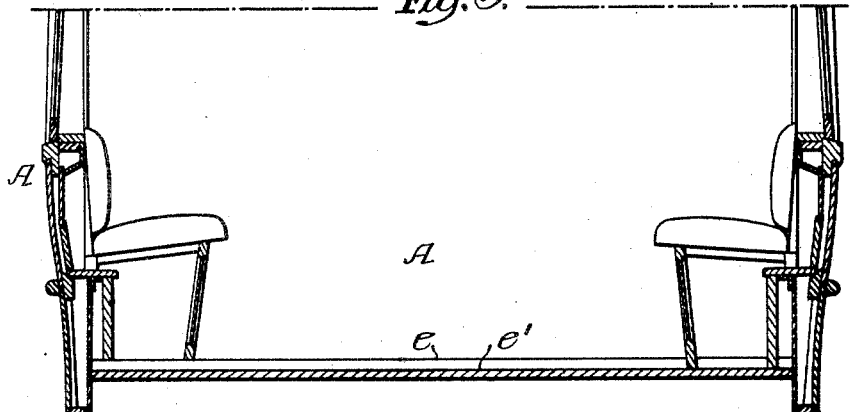
Figure 4:
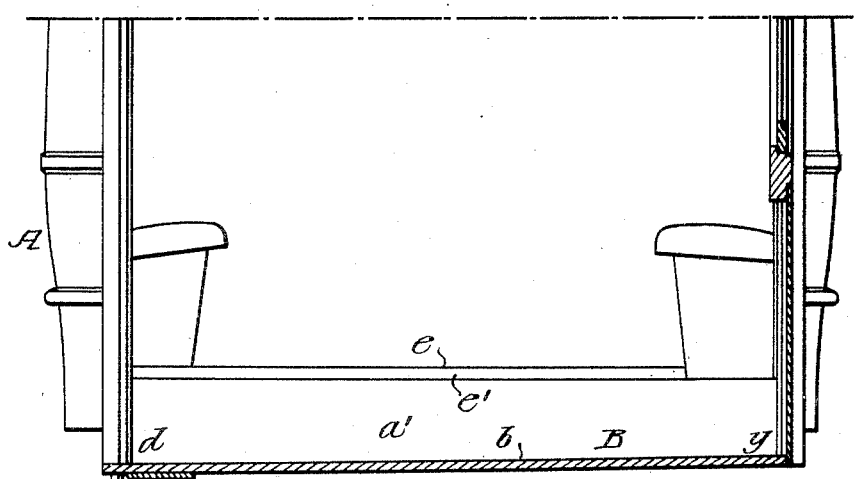
Figure 5:
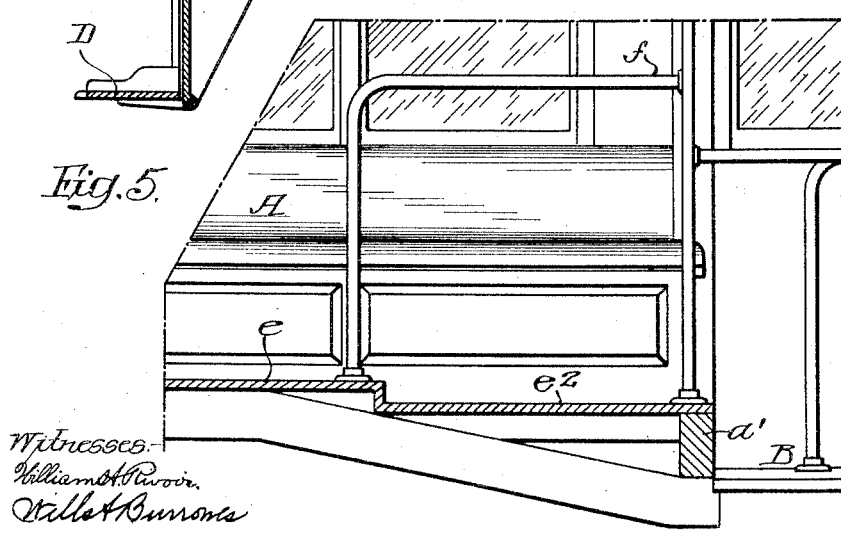

In the accompanying drawings:—Figure 1, is a longitudinal sectional view of a passenger car constructed according to my invention; Fig. 2, is a plan view; Fig. 3, is a transverse sectional view on the line 3—3, Fig. 2; Fig. 4, is a transverse sectional view of the platform on the line 4—4, Fig. 2, and Fig. 5, is a view illustrating a modification of the invention.

A is the body of the car.

B is the platform extension.

C is a truck, in the present instance, pivoted to the car body at $i$ and of the type illustrated in Fig. 1. This truck has a frame $c$; there being two axles mounted on the frame. On one of these axles are two large wheels and on the other are two small wheels; the small wheels being located under the end of the car body. In this type of truck the motor is mounted on the axle having the large wheels.

$a$—$a$ are the longitudinal stringers of the car body and $a'$ is a transverse beam formed under the car and connected in any suitable manner to the stringers $a$. This beam ordinarily forms the sill of the car and the floor $b$ of the platform is considerably below the upper edge of this sill so that a passenger entering the car steps from the platform on to this sill. The floor of the body of the car is level between the pivots of the trucks, but that portion $e'$ of the floor extending from a point $x$ to the sill is inclined, as shown in Fig. 1. I am thus enabled to reduce the height of the sill from the ground and, consequently, bring the floor of the platform closer to the ground.

$B'$—$B'$ are the beams which support the platform and extend under the car body. By utilizing the particular form of truck shown, having large wheels on one axle and small wheels on the other axle, and by locating the small wheels under the end of the car body, I am enabled to lower the floor at the end of the car body beyond the pivot of the truck without interfering with the movement of the truck.

In the car illustrated in the drawings, the platform B is open at one side $d$ and at this side is a pair of folding steps D, in the present instance, actuated on the opening and closing of the doors $d'$, although permanent steps may be used without departing from the essential features of the invention. The platform may be divided by rails in any manner desired, according to the type of car to which my invention is applied.

I preferably incline the platform from the point $y$ at the closed side of the platform to the open side $d$; thus reducing the height of the platform at the side; which is open for the ingress and egress of passengers. By reducing the height of the sill of the car body and the height of the platform at one side, I reduce the height of the step D; bringing it nearer to the ground so that a passenger can mount the step and enter the car with comparative ease.

While I prefer to provide an inclined section $e'$ near the sill of the car; I may reduce the height of the floor, as at $e^2$ Fig. 5, and, in this instance, I preferably extend the rail $f$, which separates the ingress and egress passageways, to the point where the depression or step is made so as to prevent accidents due to the depression.

In the present instance, I have shown two longitudinal seats; one extending the full length of the car and the other stopping short of the end. The seat extending the full length of the car is of the same level throughout. This increases the height of the seat at and near the sill of the car and prevents a passenger from extending his feet into the passageway and thus obstructing the same. In other types of cars, both seats may extend the full length of the car but it will be understood that while I have shown a car with a particular arrangement of partition rails, the invention may be used in connection with a car in which the rails are entirely dispensed with, or in connection with a car in which other forms of rails are employed. This arrangement can be used with a car having a central entrance, as well as with one having an entrance and exit at one end or at both ends, without departing from the essential features of the invention.

I claim:

1. The combination in a passenger car, of a body portion, a platform below the body portion, two trucks pivotally mounted under the body portion, axles on the trucks, high wheels on one axle and low wheels on the other axle, the low wheels being located under the ends of the body, the floor of the car between the pivots of the truck being level, a transverse sill at one end of the car body lower than that portion of the floor between the pivots of the trucks, and an inclined floor section extending from a point near a line through the pivot of a truck to said transverse sill.

2. The combination in a passenger car, of a body portion, a platform located below the body portion, a truck having a pair of high wheels and a pair of low wheels, the low wheels being located directly under the ends of the body portion, beams extending from the car body to and under the platform, the major portion of the floor of the body being level, that portion of the floor between the pivot for the truck and the end of the car being inclined.

3. The combination in a passenger car, of a body portion, a platform at the end of the car below the body portion, the major portion of the floor of the body of the car being level, while the end portion is inclined toward the platform, with a longitudinal seat extending to the end of the car body, the seat being of the same level throughout so that the height of the seat from the floor at the end of the car body will be greater than at a point some distance from the end, substantially as and for the purpose set forth.

4. The combination in a passenger car, of a body portion, a platform located below the body portion at one end thereof, the major portion of the floor of the car body being level, while the end of the floor at the platform is inclined toward the same, the platform being inclined from the closed side toward the open side so as to reduce the height of the step leading from the street to the platform.

In testimony whereof, I have signed my name to this specification, in the presence of two subscribing witnesses.

WALTER S. ADAMS.

Witnesses:
 HENRY C. ESLING,
 H. F. McKILLIP.